United States Patent
Sivertsen et al.

(10) Patent No.: US 10,339,090 B2
(45) Date of Patent: Jul. 2, 2019

(54) SYSTEM FOR IMPLEMENTING MXM ON A PCI CARD

(71) Applicant: ADVOLI Limited, Wanchai (HK)

(72) Inventors: Clas Gerhard Sivertsen, Lilburn, GA (US); Paal Fure Torkehagen, Taipei (TW)

(73) Assignee: ADVOLI LIMITED, Wan Chai (HK)

( * ) Notice: Subject to any disclaimer, the term of this patent is extended or adjusted under 35 U.S.C. 154(b) by 464 days.

(21) Appl. No.: 15/161,402

(22) Filed: May 23, 2016

(65) Prior Publication Data

US 2017/0337151 A1 Nov. 23, 2017

(51) Int. Cl.
| | |
|---|---|
| H05K 7/10 | (2006.01) |
| G06F 13/42 | (2006.01) |
| G06F 13/38 | (2006.01) |
| G06F 13/40 | (2006.01) |
| G06F 3/14 | (2006.01) |

(52) U.S. Cl.
CPC ............ G06F 13/4282 (2013.01); G06F 3/14 (2013.01); G06F 13/387 (2013.01); G06F 13/4068 (2013.01); G06F 2213/0026 (2013.01); G09G 2370/04 (2013.01); G09G 2370/12 (2013.01)

(58) Field of Classification Search
None
See application file for complete search history.

(56) References Cited

U.S. PATENT DOCUMENTS

| | | | |
|---|---|---|---|
| 7,663,633 B1 | 2/2010 | Diamond et al. | |
| 7,710,741 B1 * | 5/2010 | Kelleher | G06F 1/185 361/760 |
| 7,716,633 B1 * | 5/2010 | Heath | G06F 9/4401 710/300 |
| 2004/0046772 A1 | 3/2004 | Ouchi et al. | |
| 2004/0090335 A1 | 5/2004 | Pfefferseder et al. | |
| 2007/0076006 A1 | 4/2007 | Knepper et al. | |
| 2007/0224844 A1 | 9/2007 | Chuang et al. | |
| 2007/0294452 A1 | 12/2007 | Chiu et al. | |
| 2008/0055189 A1 | 3/2008 | Wilk et al. | |
| 2008/0137759 A1 | 6/2008 | Cai et al. | |

(Continued)

FOREIGN PATENT DOCUMENTS

| | | |
|---|---|---|
| CN | 101114214 A | 1/2008 |
| CN | 201594679 U | 9/2010 |

OTHER PUBLICATIONS

Optic Fiber Network, May 2014, "www.lanshack.com", pp. 1-6.*
International Search Report dated Nov. 22, 2017 cited in Application No. PCT/IB2017/000736, 17 pgs.

*Primary Examiner* — Henry Tsai
*Assistant Examiner* — Dean Phan
(74) *Attorney, Agent, or Firm* — Locke Lord LLP; Tim Tingkang Xia, Esq.

(57) ABSTRACT

A video card is disclosed. The video card includes a PCI card, an MXM connector and a LAN converter. The mobile PCI express module ("MXM") connector is mounted on the PCI card and adapted to physically receive an MXM card having a GPU and to electronically receive a video signal from the GPU. The local area network video converter is mounted on the PCI card for receiving the video signal from the MXM connector and for converting the video signal to a signal suitable for transmission on a local area network ("LAN") cable.

31 Claims, 10 Drawing Sheets

(56) References Cited

U.S. PATENT DOCUMENTS

| | | |
|---|---|---|
| 2008/0285576 A1* | 11/2008 | Teener ................ H04L 12/2805 |
| | | 370/403 |
| 2009/0033668 A1 | 2/2009 | Pederson et al. |
| 2010/0054345 A1 | 3/2010 | Yamamoto |
| 2010/0321395 A1 | 12/2010 | Maciesowicz et al. |
| 2012/0201544 A1 | 8/2012 | Zhang et al. |
| 2013/0067534 A1 | 3/2013 | Soffer |
| 2013/0176496 A1 | 7/2013 | Sisto et al. |
| 2013/0242760 A1 | 9/2013 | Peyton et al. |
| 2014/0245053 A1* | 8/2014 | Yoshikawa ........... G06F 1/3253 |
| | | 713/324 |
| 2015/0049256 A1 | 2/2015 | Goodart et al. |
| 2015/0294434 A1* | 10/2015 | Nataros ................ G09G 5/363 |
| | | 345/520 |
| 2016/0125836 A1 | 5/2016 | Kim |

* cited by examiner

SYSTEM FOR IMPLEMENTING MXM ON A PCI CARD

TECHNICAL FIELD

This disclosure relates to video cards, and, more particularly, to PCI video cards that use graphic processing units from an MXM mounted on the PCI video card.

BACKGROUND

Graphics cards for computers may come in the form of Peripheral Component Interconnect ("PCI") Express cards that interface through a computer by way of a PCI Express Interface. Most prior art PCI Express video cards come with a Graphics Processing Unit ("GPU") hard-wired onto the card itself. Thus, when the graphics requirements of a computer system need to be increased, the entire PCI Express video card must be replaced. Mobile PCI Express Modules ("MXM") are a comparable technology for graphics cards and are used in notebook computers. Like PCI Express video cards, MXM come with a GPU hard wired onto the MXM.

BRIEF DESCRIPTION OF THE DRAWINGS

The accompanying drawings, which are incorporated in and constitute a part of this disclosure, illustrate various embodiments of the present disclosure. In the drawings.

DESCRIPTION OF EXAMPLE EMBODIMENTS

Figure 1:
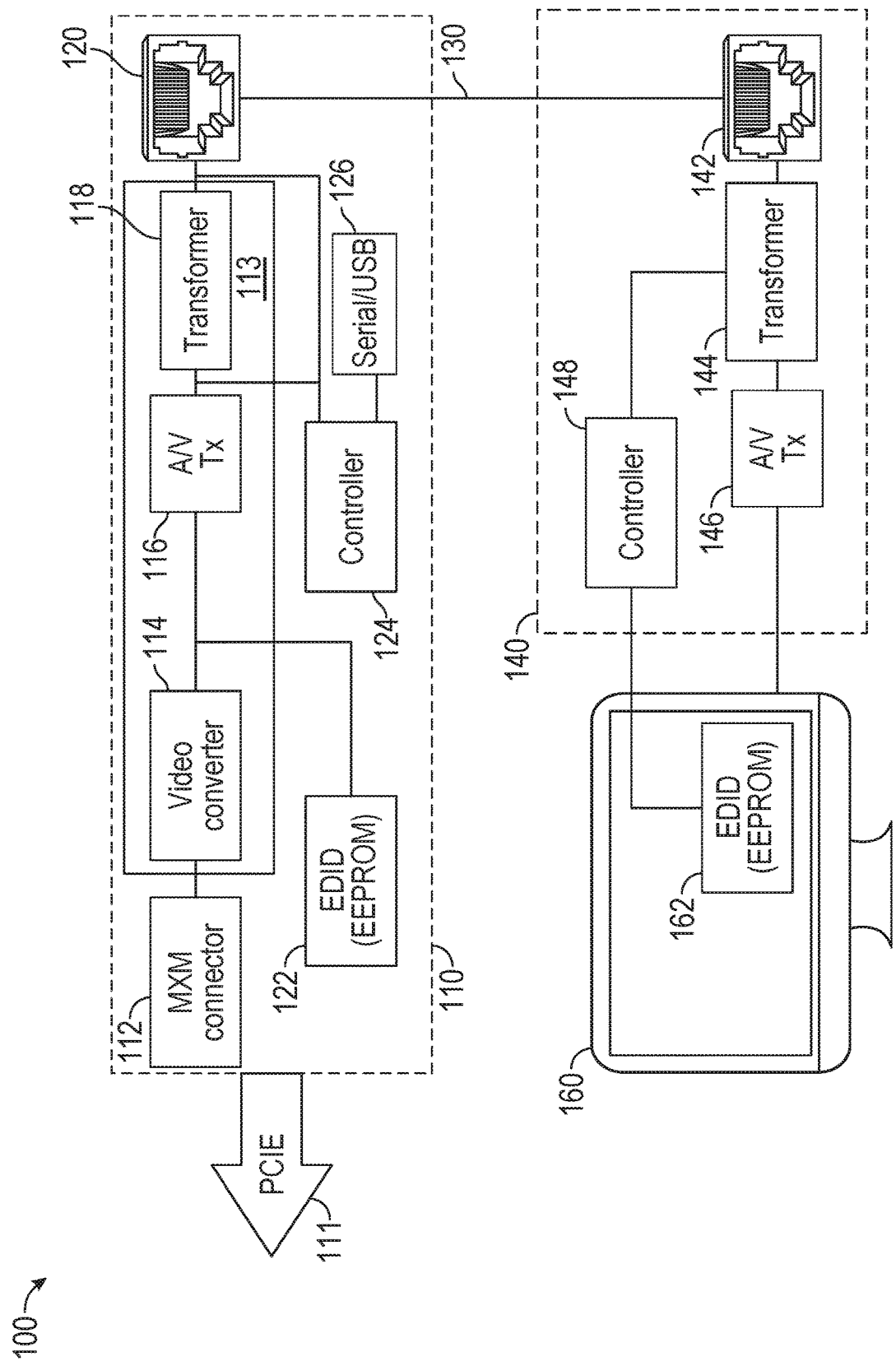
FIG. 1 is a block diagram of an exemplary display system in accordance with some embodiments.

The following disclosure describes a PCI Express video card that has an MXM connector mounted on the PCI card. The MXM connector can physically and electronically receive an MXM card having a GPU. The GPU of the MXM card acts as the GPU for the PCI express video card. Thus, the GPU power of the PCI video card can easily be changed by changing out the swappable MXM card.

MXM currently comes in at least two types of modules: currently Type A and Type B, both of which are 82 mm wide, but they differ in length. Type A is 70 mm in length and Type B is 105 mm in length. Although the MXM specification in detail describes the signal on most pins of the modules, there are additional signals needed which were not described in the earlier versions of the specifications, specifically for the auxiliary channels and Presence Detects for channels E and F, referred to as hot plug detect. This resulted in the industry adopting at least two physical pinout definitions. Although there is no official specification describing these or an official name for these various implementations, the two versions described herein will be referred to as "TUL style" and "AMD style", which is based on the vendors who originally adopted those respective pin definitions. Embodiments disclosed herein may be able to accept either style of MXM card. As more vendors develop MXM in the future and add features with inconsistent pinouts between vendors, it should be appreciated that the detection method and solution described herein on how to make a host recipient of MXM compatible with a multitude of types and implementations may be extended to include more than just the two specific methods described herein. There are two main types of MXM cards: TUL style and AMD style. Embodiments disclosed herein may be able to accept either style of MXM card.

Also, the PCI express card may be powered solely by the PCI express bus without the need for additional power connections directly to the card.

In addition, embodiments consistent with the invention can transmit more than one video signal, and the video signals may be transmitted over LAN cables, such as twisted pair cable or fiber optic cable. We term a video card that transmits video over LAN cables as a "LAN-Cable Video Card™" or "LAN-CVC™," both of which are trademarks of Advoli Ltd. For example, certain embodiments may transmit six video signals over a respective six LAN cables. Embodiments also may have the ability to perform frame locking to other video cards within the system or externally to one or more video cards in other systems or generator locking to an external timing generator, and/or implement 3D left/right stereo synchronization ("3D sync") functionality.

Embodiments may have a USB port coupled to a controller in the video card. The USB port may map a serial port for each of n video signals generated by the video card. The USB port may also map an nth+1 video signal that can be used to control the card or be used to send signals to be replicated along one or more of the n video signals.

Embodiments may also have a multi-format video sync generator unit that is controlled from a host computer via the USB port. The multi-format video sync generator ("MF-VSG") may serve as a timing server for the video card, as well as for a second video card that is either in the same computer or a different computer. A timing signal generated by the multi-format video sync generator may provide for timing synchronization over the LAN cable. The multi-format video sync generator may act as a master for other cards or as a slave to an external master, and may also be used internally in a daisy chained mode as master or slave.

The video card may also be operable to wake-up a computer in which the video card is mounted based on asserting a PCI-Wake signal. The controller on the video card may also be able to override the power button on the computer in which the video card is mounted.

One method for the video card to override the power button on the computer is to affix a cable between a 2-pin header on the video card to the 2-pin header that every PC motherboard have as a standard way of manually controlling power. The video card wishing to turn power on would then briefly short both pins to logical ground using am Open Drain Field Effect Transistor or alike, so that no matter which orientation this power button cable is installed, it would produce a power on signal. To turn the computer off, the same method would be used. To force the computer to turn off, the video card would assert both the power button pins to ground for several seconds until the system power is forced off, a feature which is standard in all ATX power supply based systems.

Another method of controlling the power of the host, is to use the USB controller feature of the video card controller. It can programmatically be configured to disconnect all of its current functions as virtual serial port controller, and reinitialize itself as a Human Interface Device ("HID"). This type of device may issue regular keyboard keystroke functions to the computer, but it may also feature items like power on, power off, suspend, or sleep which many keyboards already implement. The USB function for HID is active during sleep or power off modes so that a computer system can be powered up by simply entering strokes on the keyboard or issuing a command emulating a power button on an external keyboard.

The computer in which the video card is mounted may follow the power state of an external display connected to the LAN cable. Similarly, the power state of a plurality of displays may follow the power state of an external display connected to one of the LAN cables.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

FIG. 1 is a block diagram of an exemplary display system in accordance with some embodiments. As shown in FIG. 1, a display system 100 is provided. The display system 100 includes a graphics card 110, a display 160, and a display adapter 140. The graphics card 110 may be plugged onto a motherboard (not shown) of a computer (not shown) via, for example, a PCI Express Interface 111. The graphics card 110 may include an MXM connector 112; a LAN converter 113 including a video converter 114, an audio/video ("AN") transmitter 116, and a transformer 118; an RJ45 connector 120 (which could be a male or female connector); a memory 122; and, a controller 124 connected to a serial port, such as USB port 126. The MXM connector 112 is connected to the video converter 114, for example with Display Port signals, and video converter 114 may contain a Display Port to HDMI converter.

Figure 3:
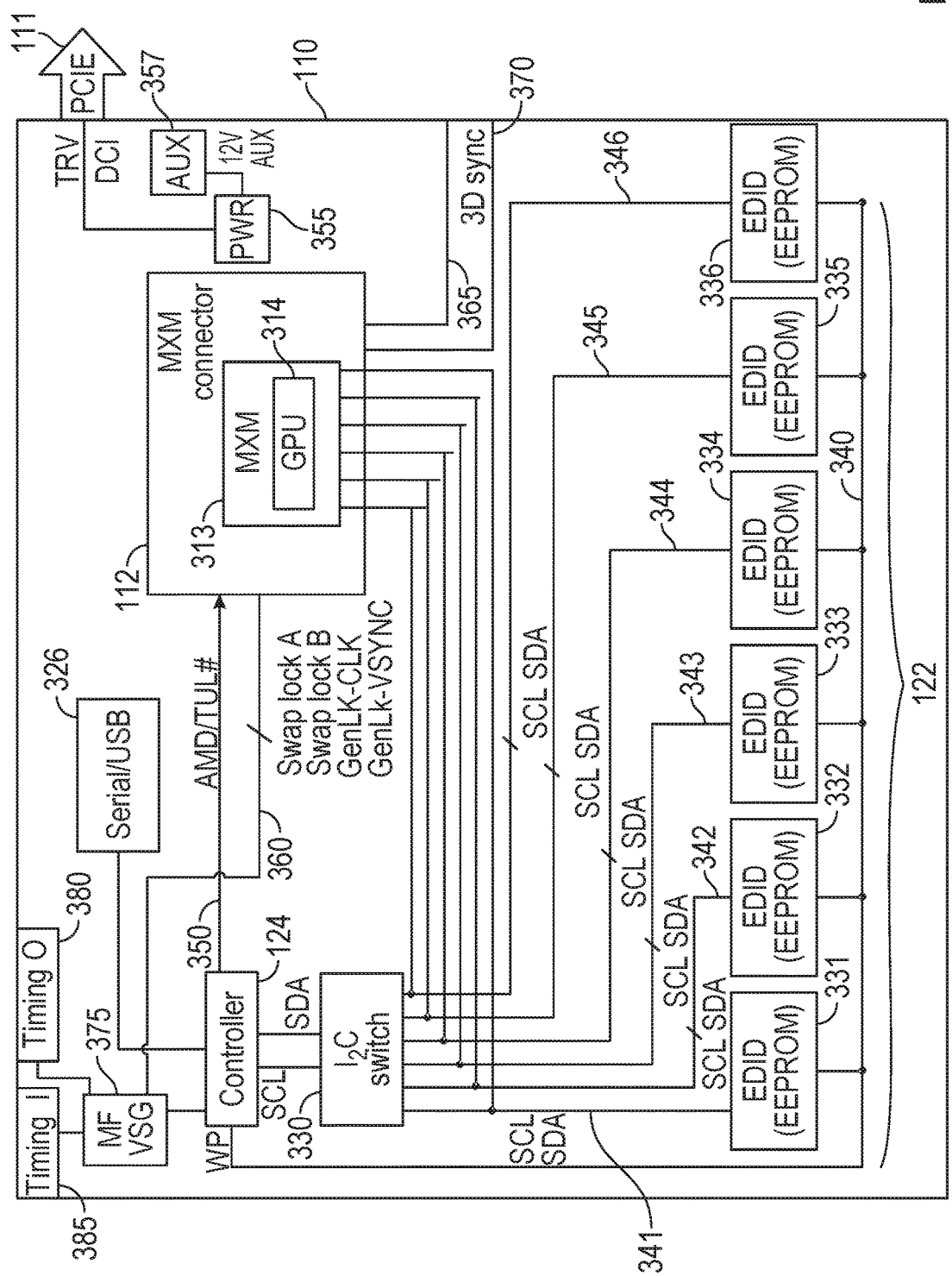
FIG. 3 is a block diagram of further details of FIG. 1 in accordance with some embodiments.

The MXM connector 112 provides a socket for plugging in an MXM card which provides video data, for example, video data via Display Port interface to the LAN video converter 113. Display Port is a digital display interface developed by the Video Electronics Standards Association (VESA), and is primarily used to connect a video source to a computer display, though it can also be used to carry audio, USB, and other forms of data. FIG. 3 will provide further detail on MXM connector 112.

As previously mentioned, the LAN video converter 113 includes video converter 114, audio/video transmitter 116, and transformer 118. The output of the video converter 114 is connected to the audio/video transmitter 116 and to an EDID, "Extended Display Identification Data," (EEPROM) 122. The video converter 114 receives and outputs video data to audio/video transmitter 116 via an HDMI interface. The audio/video transmitter 116 is further connected to the transformer 118 and transmits an audio/video signal. Existing technology examples of audio/video transmitters and receivers are Valens chipsets utilizing HDBaseT standard and Aptovision BlueRiver chipsets using standard IP based systems. Those skilled in the art after reading this disclosure would appreciate that other chip sets with other standards could be used as the audio video transmitter 116. The audio/video signal may be HDBaseT. HDBaseT is a consumer electronic and commercial connectivity standard for transmission of uncompressed high-definition video, audio, power, home networking, Ethernet, USB, and some control signals, over a common category (ordinary Cat5 may be used, but Cat6e or above provides for longer reach) cable with a standard connector (RJ45). HDBaseT can be transmitted over category 6a cables or above up to 100 meter, or even longer, with 8P8C modular connectors of the type commonly used for local area network connections. The transformer 118 is designed and manufactured to comply with the appropriate standard, such as HDBaseT standards.

The video data from the audio/video transmitter 116 is sent to a local area network 130, such as Ethernet, by using the RJ45 connector 120. For example, HDBaseT supports the 100 Mbit/s version of Ethernet over twisted pair known as 100BASE-T. Fiber optic technology could also be used in place of twisted pair cabling for the local area network 130. This can provide Internet access, or enable televisions, stereos, computers and other devices to communicate with each other and access multimedia content, including video, pictures and music stored on the local network.

The controller 124 is connected to the EDID (EEPROM) 122 and both sides of the transformer 118. The controller 124 may be a digital signal processor, a processor, a microprocessor, or a microcomputer on a chip. In certain embodiments, controller 124 and controller 148 are low power microprocessors. The controller 124 transmits and receives control information to and from a controller 148 on the communications adapter 140 through side-band communication. This control information may be transmitted using the CEC standard. More detail on this novel electrical circuit is described with respect to FIG. 2 below. The display 160 in communication with adapter 140 need not be powered on for this control communication to occur.

The display adapter 140 includes an RJ45 connector 142 (which could be a male or female connector), a transformer 144, audio/video receiver 146, and the controller 148. The transformer 144 is designed and manufactured to comply with the appropriate standard, such as the HDBaseT standards. The audio/video receiver 146 receives video data from the audio/video transmitter 116, by using the RJ45 connector 142 and the local area network 130.

The display 160 is connected to the display adapter 140 via HDMI interface. A memory 162 (such as an EEPROM) storing an EDID of the display 160 is powered by HDMI interface even if the display is turned off. The controller 148 may be a digital signal processor, a processor, a microprocessor, a microcomputer on a chip, or a System On a Chip ("SOC"). The controller 148 of the display adapter 140 communicates with controller 124 of graphics card 110 to facilitate the transfer of control signals between the display 162 and the graphics card 110.

As the graphics card controller 124 is in communication with the adapter controller 148, the host computer, via a virtual serial port implemented over USB 126, can effectively issue commands or requests to the display 160 or it can receive requests from the display 160. For example, the controllers 124 and 148 may cooperate to issue commands to the display 160 using the CEC protocol. CEC is a set of commands that utilizes HDMI's two-way communication to allow for remote control of any CEC-enabled devices connected with HDMI. As another example a keyboard and/or mouse could be connected to the display 160 and issue commands back to the host computer. Using CEC, the host computer can issue commands to, for example: turn displays on or off; adjust contrast or brightness; or adjust color. CEC can also be used to query information from the displays, such as the model, serial number, and manufacturing date of the display.

Serial port or interface 126 may be a USB port. When a USB port is used as serial port 126, as multiple video signals may be generated by video card 110, USB port 126 may map the port as one serial port for each of n (where n>=1) video signals and each serial port may be mapped to a virtual, non-physical COM port via a single USB cable as a USB multifunction device. In addition the USB port may map an nth+1 virtual serial port for communication with controller 124. The controller 124 may be configured to receive an encapsulated command from the nth+1 serial port and communicate a command within the encapsulation across each of the n serial ports. Furthermore, the controller may be configured to receive a response to the command, encapsulate the response to the command along with a video channel, n, from which the response was received, and send that encapsulated response to the nth+1 serial port. Through this, commands or requests can be sent from the host computer to a plurality of displays.

Also, the controller 124 may be configured to receive a command from the nth+1 serial port and respond to the command. Through this, the video card 110 may be configured and/or queried.

Controller 124 may also be configured to reset the host computer in which video card 110 is mounted based on receiving a PCI-Reset signal. Likewise, controller 124 may be configured to wake-up the computer in which the video card is mounted based on asserting a PCI-Wake signal. Controller 124 may also be configured to override the power button of the host computer in which the video card is mounted. This may be done by installing an additional wire from the video card 110 to the motherboard power button. Using this feature, the controller 124 may be operable to have the computer follow the power state of an external display connected to the LAN cable 130. The controller 124 may also be configured to receive a power state of a first of a plurality of displays to which the video card 110 is connected via a first of a plurality of LAN cables 130, and controller 124 commands the remainder of the displays to follow the state of the first display.

Another method for turning the system OFF is to logically disconnect the USB connection as a virtual serial port, re-mount the USB as a USB HID device emulating a USB keyboard with a power button, and then issue a power button command to the host, as previously explained. This is possible because the controller 124 is powered from standby power, this same method can also be used to power the system ON.

Figure 2:
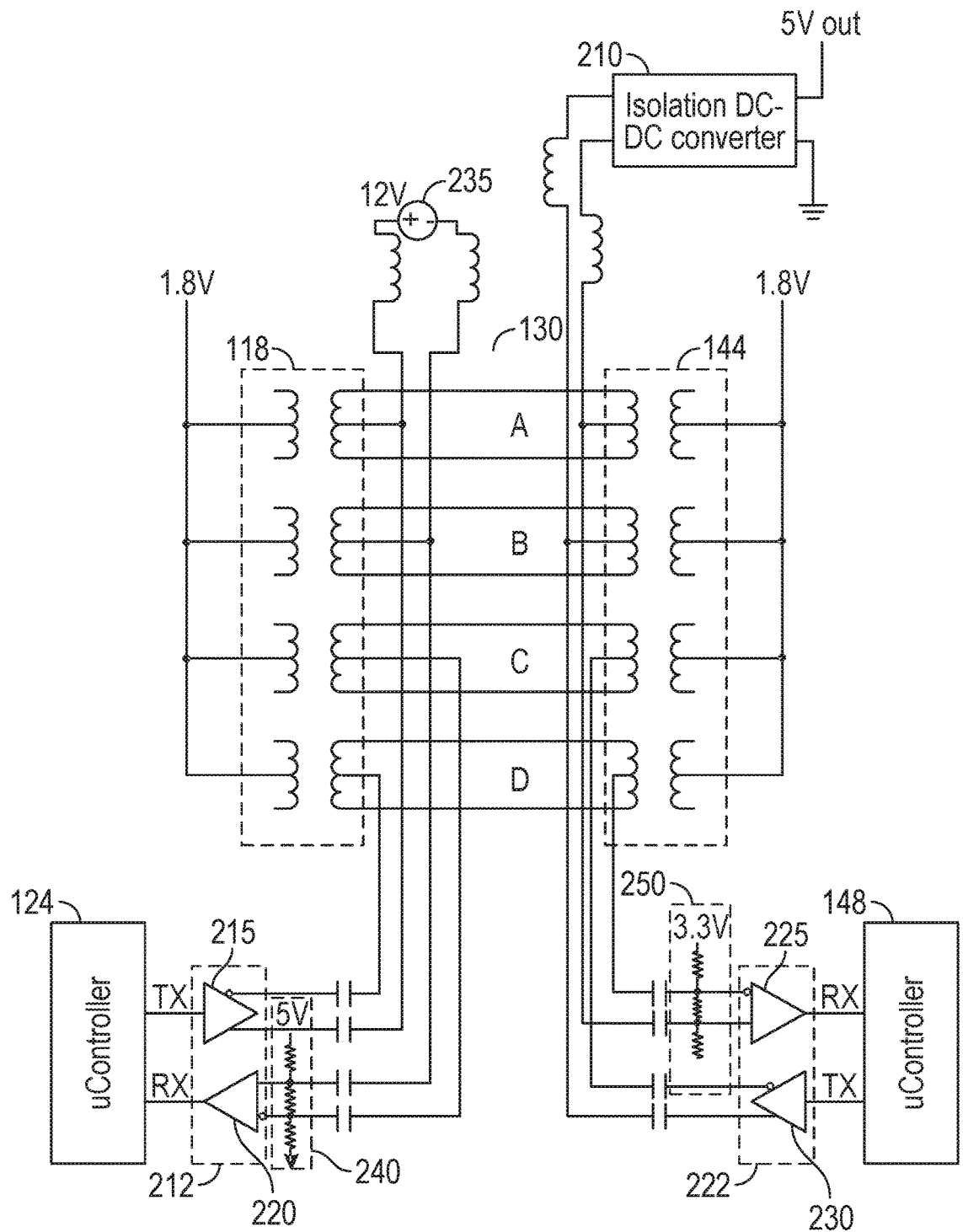
FIG. 2 is an electrical drawing in more detail of the transmission circuitry in accordance with some embodiments.

FIG. 2 is an electrical drawing in more detail of the transmission circuitry in accordance with some embodiments. This discloses a single channel. Controller 124 communicates using single ended UART ("Universal Asynchronous Receiver/Transmitter") transmitter (TX) and receiver (RX) signals to a UART to RS485 converter 212. The UART to RS485 converter 212 converts, at differential transmitter 215, the TX from single ended UART signal to a differential signal on two wires and converts, at differential receiver 220, incoming RS485 two wire signals to a single UART signal. By using a two wire signal, there is common mode noise rejection. Once the signal has been differentialized, it is placed on the twisted pair cable using the common mode of the transformer 118. In this exemplary figure, the transmit signals are placed on the center taps of coils A and D, respectively. The received signals are received from the center taps of coils B and C, respectively. The outside taps of coils A, B, C, and D contain the communications signals, for example the HDBaseT signals. This is done because the power level and ground at the graphics card 110 may be different from the power level and ground at adapter 140. The transformer 118 and 144 provide galvanic isolation.

Power supply 235 of, for example, +12 volts goes into the center tap of coil A and the minus side of power supply goes into the center tap of coil B. Thus, power is transmitted on the common mode of the transformer. Any voltage could of course be used. The power is transmitted across the twisted pair cabling to the display side. At the display side, the power is retrieved from the center taps of the coils and goes to DC to DC isolation converter 210 providing power to whatever needs it at the adapter 140 side. The power supply is tightly held at, for example, 12 volts and varies slightly with the PAM signal that is carried over the twisted pair. Thus, power is injected at, for example, 12 volts by the graphics card 110 and power is extracted by the adapter 140.

The adapter controller 148 has a similar configuration to that described in the previous paragraphs. Adapter controller 148 also communicates using UART single ended transmission (TX) and receiver (RX) UART signals to UART to RS485 converter 222. UART to RS485 converter 222 converts, at differential transmitter 230, the TX from single ended UART signals to a differential signal on two wires and converts, at differential receiver 225, incoming RS485 two wire signals to a single UART signal. By using a two wire signal, there is common mode noise rejection. Once the signal has been differentialized, it is placed on the twisted pair cable using the common mode of transformer 144. In this exemplary figure, the receive signals are received from the center taps of coils A and D, respectively. The transmit signals are transmitted from the center taps of coils B and C, respectively. The outside taps of coils A, B, C, and D contain the communications signals, for example the HDBaseT PAM signals.

Isolation capacitors are used on both sides to isolate the circuits on each side from the other side. Biasing circuits 240 and 250 provide potential on the otherwise floating receiver differential circuit. In one exemplary embodiment, each of the three resistors is 100 kilo ohms.

Thus, the above system uniquely uses the common mode of the transformer in order to communicate side-band control signals from a graphics card to an adapter. These signals are superimposed over the standard communications signals that are placed on the twisted pair cabling. By using sideband communications in conjunction with the power supply system described above, control signals can be transmitted and received, even if the display system is powered off. The power on the primary side of the transformers showing 1.8V may be 0V when the system is powered off, but the differential signals on the secondary transformer side will still work the same. Also, the power to the common mode of the secondary side of the transformers showing 12V may be 0V when the system is powered off, but the differential signals superimposed on these signals will continue to operate at a different bias level.

FIG. 3 is a block diagram of further details of FIG. 1 in accordance with some embodiments. As shown in FIG. 3, a graphics card 110 is provided. The graphics card 110 includes the MXM connector 112, an I²C Bus/SMBus solid state switch 330, EEPROMs 331-336, communications interfaces 341-346, and a controller 124. An I²C Bus is a multi-master, multi-slave, single-ended, serial computer bus conceived of by Philips Semiconductor (now NXP Semiconductors). It is typically used for attaching lower-speed peripheral ICs to processors and microcontrollers in short-distance, intra-board communication. An SMBus is a single-ended simple two-wire bus for the purpose of lightweight communication. The MXM 313 includes a GPU 314 providing video data to, for example, six channels.

As shown in FIG. 1, the video card 110 receives and stores an EDID of a display 160 as an emulated EDID in the memory 122 of the graphics card 110. The controller 124 stores the EDID of the display 160 by using the switch 330 to access the EEPROMs 122. The switch 330 communicates with the controller 124 via I²C Bus. I²C is compatible with SMbus, and uses two bidirectional open-drain lines, Serial Data Line (SDA) and Serial Clock Line (SCL), pulled up with resistors. The controller has a Write Protect line in communication with EEPROMs 122. The controller 124 further updates the emulated EDID in the EEPROMs 122 over SDA and SCL (341-346) based on model information (such as DELL U2415) in the emulated EDID. The controller 124 sends the model information (such as DELL U2415) to an application via a serial interface, such as USB interface 126. The application searches for a native resolution (such as 1920 x 1200) corresponding to the display 160 over the Internet or a specific database based on the model information (example, DELL U2415). The native resolution of a LCD, LCoS or other display refers to its single fixed resolution of actual number of pixels. As an LCD display consists of a fixed raster, it cannot change physical resolution to match the signal being displayed, meaning that optimal display quality can be reached only when the signal input matches the native resolution. Moreover, the controller 124 modifies the emulated EDID based on the native resolution (such as 3,840×2,160) corresponding to the display 160.

For example, if the application finds the native resolution of the display 160, the application sends it back to the controller 124. The controller 124 adds the native resolution corresponding to the display 160 to the emulated EDID in the EEPROM 331 of the graphics card 110, and may remove the remaining resolutions except for the native resolution within the emulated EDID in the EEPROM 122 of the graphics card 110.

After retrieving the native resolution, the application further cooperates with a video player (for example, online video conversion services, such as Zencoder (zencoder.com) or Amazon Elastic Transcoder (aws.amazon.com/elastic-transcoder), or Coconut (coconut.co)). Zencoder takes care of video scaling which requires high computing power, and sends "pixel perfect" video stream back to the system. Pixel perfect refers to the following: the number of pixels in the video source perfectly match to that of the native resolution of a display. Based on our experimental results, the loading of the MXM card with GPU 313 and CPU (not shown) when playing a video stream may decrease from 80% to 20% due to the pixels perfectly matching the actual resolution of the displays.

Communications interface 126 may be any type of communications port. For example, it may be a serial port, such as a USB port. Those skilled in the art will appreciate that any type of communications port of any protocol could be used and interfaced with graphics card controller 124. Communications interface 126 may be in communication with, for example, the host computer in which adapter 110 is mounted. Thus, the host computer can communicate via communications interface 126 directly with the graphics card controller 124. For example, applications or web browsers may open a port to communicate directly with a graphics card controller 124 to issue commands or requests of the graphics card controller 124.

As the graphics card controller 124 is in communication with the adapter controller 148, the host computer can effectively issue commands or requests to the display 160. For example, the controllers 124 and 148 may cooperate to issue commands to the display 160 using the Consumer Electronics Control ("CEC") protocol. Using CEC, the host computer can issue commands to, for example, turn displays on or off; adjust contrast or brightness; or adjust color. CEC can also be used to query information from the displays, such as the model, serial number, and manufacturing date of the display.

Those skilled in the art after reading this disclosure can understand the broad range of use that this unique ability allows. For example, a database can be established, either locally at the host computer or in the cloud that could store information about the displays that comprise a video wall—essentially an inventory of the displays that make up a video wall along with information about each of the displays. An application or web browser would open a port to the communications interface 126 of the graphics card 110. The application or web browser would then query each, or only a select number, of displays attached to the system; retrieve information about each of the displays; and store this information in the database. Thus, a near instant inventory of a display wall could be accomplished.

In addition to the above features, the video card 110 also has additional features permitting enhanced synchronization capabilities and the ability to use MXM cards 313 mounted on an MXM connector 112 as the GPU for video card 110. In an exemplary embodiment MXM card 313 contains a GPU 314 and is mounted on MXM connector 112. By using an MXM 313 card as essentially a daughter board to video card 110, the graphics processing power of video card 110 can be easily customized.

There are currently at least two different hardware pinouts of MXM cards. We shall term them based on the original manufacturers of the two different hardware pinouts TUL style and AMD style. Many different manufacturers make these cards, but they currently adopt one of these two styles. Those skilled in the art after reading this disclosure would appreciate that additional styles may be developed and the invention is intended to cover those additional styles as well. The video card 110 may initially assume that the MXM card 313 is an AMD style card by having AMD/TUL# line 350 initially being driven high. If video is detected from channel six of the video card 110, then the controller 124 knows that AMD is the correct type card in the MXM connector 112 and a flag is set to indicate AMD type. If video is not detected from channel six of the video card 110, but there is video detected on channels 1, 2, 3, 4, or 5, then the controller 124 knows that a TUL style card is installed in MXM connector 112. In this case, a flag is set indicating a TUL style card; AMD/TUL# 350 is driven low, and the MXM connector 112 is configured to operate with a TUL style card.

Another feature of the present embodiment is that it may be able to operate being powered solely by power drawn from the PCIE bus 111. Normally, an auxiliary power connector 357 would be attached to the power supply of the host computer. This would typically supply 12V AUX power to a power supply 355 of video card 110. However, if 12V AUX is not present, 12V PCI is drawn from PCIE bus 111 at power supply 355. Thus, even if a user were to forget to connect auxiliary power, or should the auxiliary power cable be broken, video card 110 would continue to operate due to 12V PCI power from PCIE bus 111.

Video card 110 may also provide for frame synchronization. Frame Lock provides a common sync signal between graphics cards to insure that the vertical sync pulse across all the video cards in the complete overall system has a common start and equal frequency. Video card 110 may also include a multi-format video sync generator unit 375 connected to the controller 124 and controlled from a host computer via the USB or virtual serial port 126 as well as a second video card (not shown) in the same host computer or a different computer. The multi-format video sync generator unit 375 may provide a timing synchronization signal over the LAN cable, and may also provide this signal to a timing out connector 380. Video card 110 contains four signals to and from GPU 314 via MXM connector 112: These four signals are SWAPLOCKA, SWAPLOCKB, GENLK_CLK, AND GENLK_VSYNC. These signals are carried from the MXM connector 112 over bus 360 to a multi-function video sync generator 375. The multifunction video sync generator 375 receives an FL_MSTR (Frame Lock Master) signal on Timing I 385 and outputs an FL_SLAVE output on Timing O 380. The FL_SLAVE signal receives synchronization input signals and the FL_Master drives synchronization output signals. FIGS. 5-9 discussed later will demonstrate how these signals can be used to coordinate multiple video cards in one host computer, multiple host computers, or may be used in conjunction with an external master synchronization signal.

Timing out connector 380 may be a U.FL, IPEX, IPAX, IPX, AMC, MHF or UMCC connector. They are a miniature RF connector for high-frequency signals up to 6 GHz manufactured by Hirose Electric Group and others. The multi-format video sync generator unit 375 may also be connected to a second timing in connector 385, wherein when the multi-format video sync generator unit 375 detects a signal on the second timing connector 385 and acts as a slave to an external master and behaves as a timing client. Timing in connector 385 may be a U.FL, IPEX, IPAX, IPX, AMC, MHF or UMCC connector. They are a miniature RF connector for high-frequency signals up to 6 GHz manufactured by Hirose Electric Group and others.

Video card 110 may also include a 3DSync (also called 3D Stereo Sync) signal 370 for providing a signal protocol designating the left or right frame of a 3D signal. This signal is also synchronized between all video cards across the complete system, so that other VSYNC on each of the video outputs correctly synchronizes Left and Right frame across the video sources.

Figure 4:
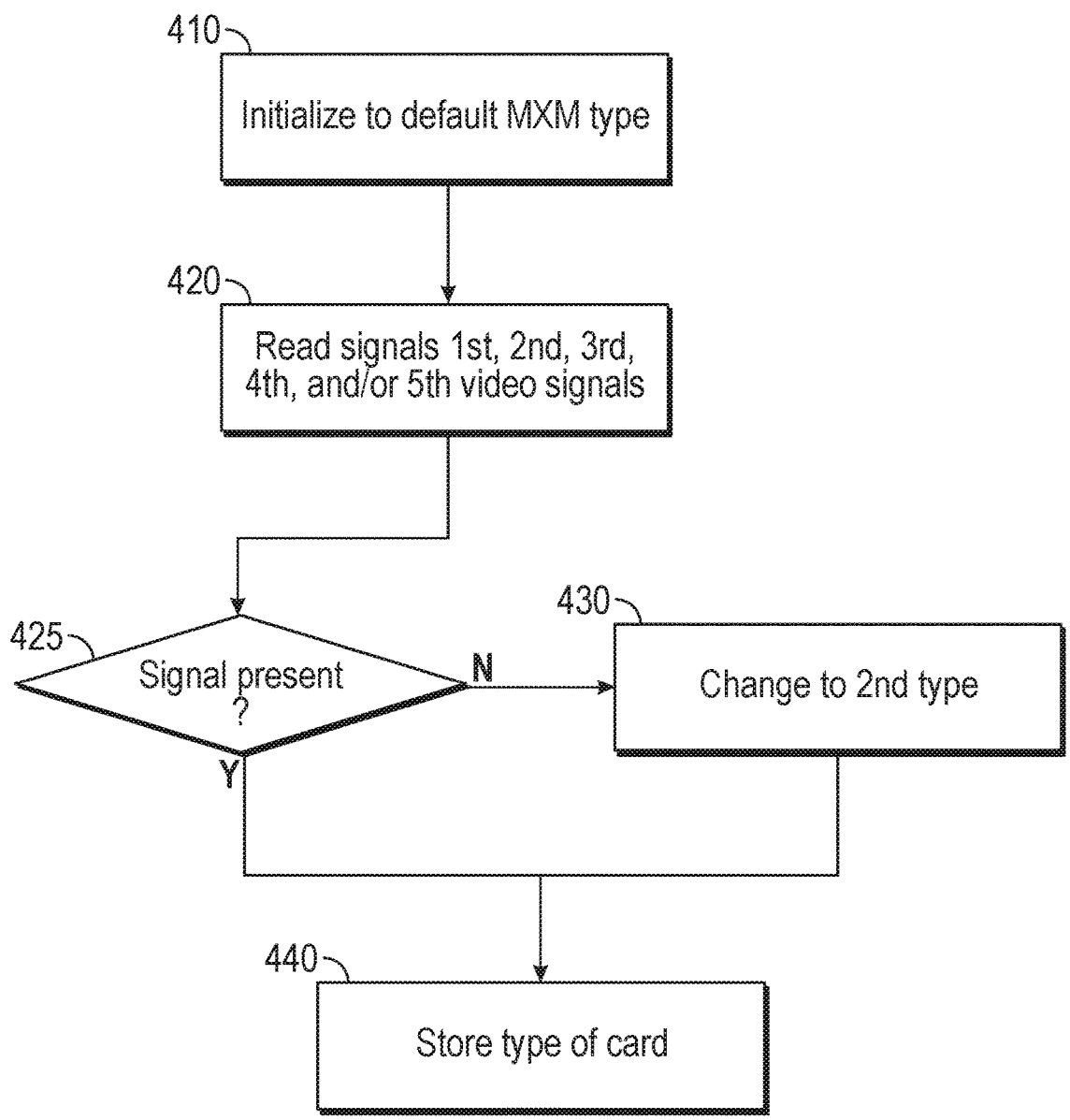
FIG. 4 is a flow chart of a method of detecting a type of MXM card inserted into an MXM connector.

FIG. 4 is a flow chart of a method of detecting a type of MXM card inserted into an MXM connector. The system is initialized to a default setting of a first type of MXM card, for example, an AMD type of MXM card (stage 410). The system receives a signal indicating the presence of one or more video signals on the first through fifth video signals (stage 420). If there is a video signal on any of the first through fifth video signals and if a video signal on the sixth video channel is not detected (stage 425), the type of MXM card is changed to a second type of card (stage 430). For example, if an AMD type of MXM card is the default and no signal is detected on the sixth video channel, the type of MXM card is changed to a TUL type card. If a video signal is detected after changing the type of video card to the second type, the default setting of the type of MXM card is updated and stored in non-volatile memory so that the card will be powered up and configured for the correct type of MXM card in the future (stage 440). Also, a switch or jumper may be set to manually select either a first type or a second type of MXM card. Those of ordinary skill in the art after reading this disclosure will appreciate that if there are n types of MXM cards, switches, jumpers, dials or other devices could be used to manually select the type of MXM card.

Figure 5:
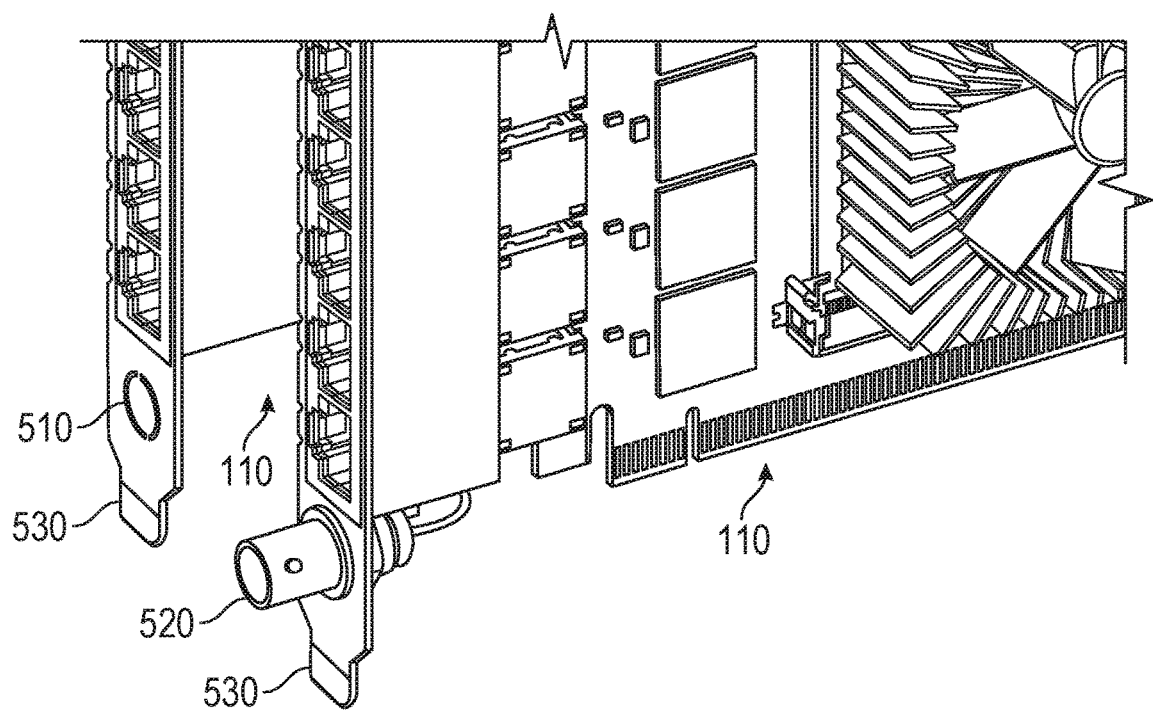
FIG. 5 illustrates video card 110 with a BNC connector.

FIG. 5 illustrates video card 110 with a BNC connector. The video card 110 may come with a knockout 510. The knockout 510 may be removed and a BNC connector 520 may be put in its placed. The BNC connector 520 permits easy external access to internal signals on video card 110, as will be shown in the next figures.

Figure 6:
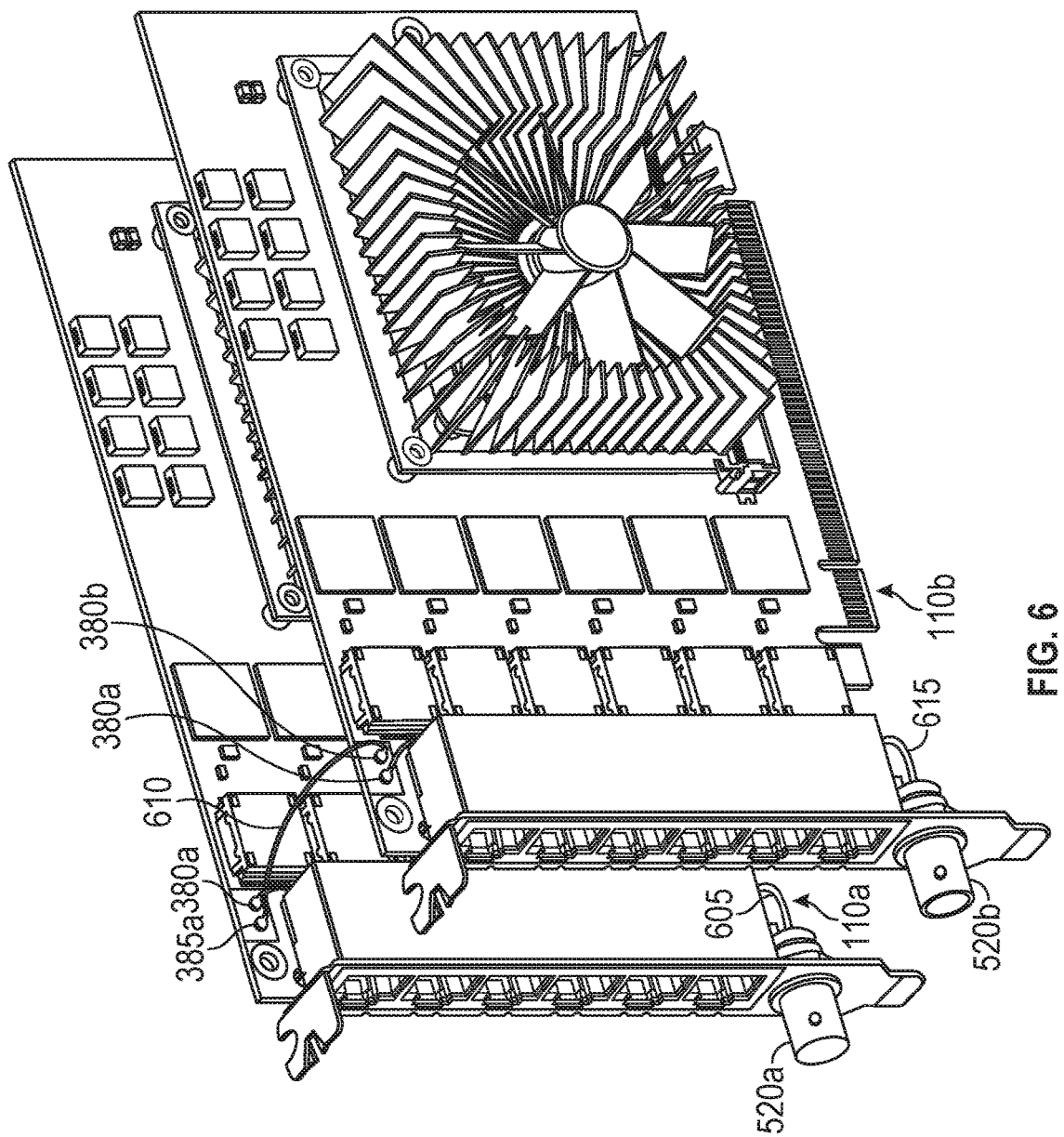
FIG. 6 illustrates video cards 110 daisy chained together for Frame Lock and/or Genlock operation.
Figure 7:
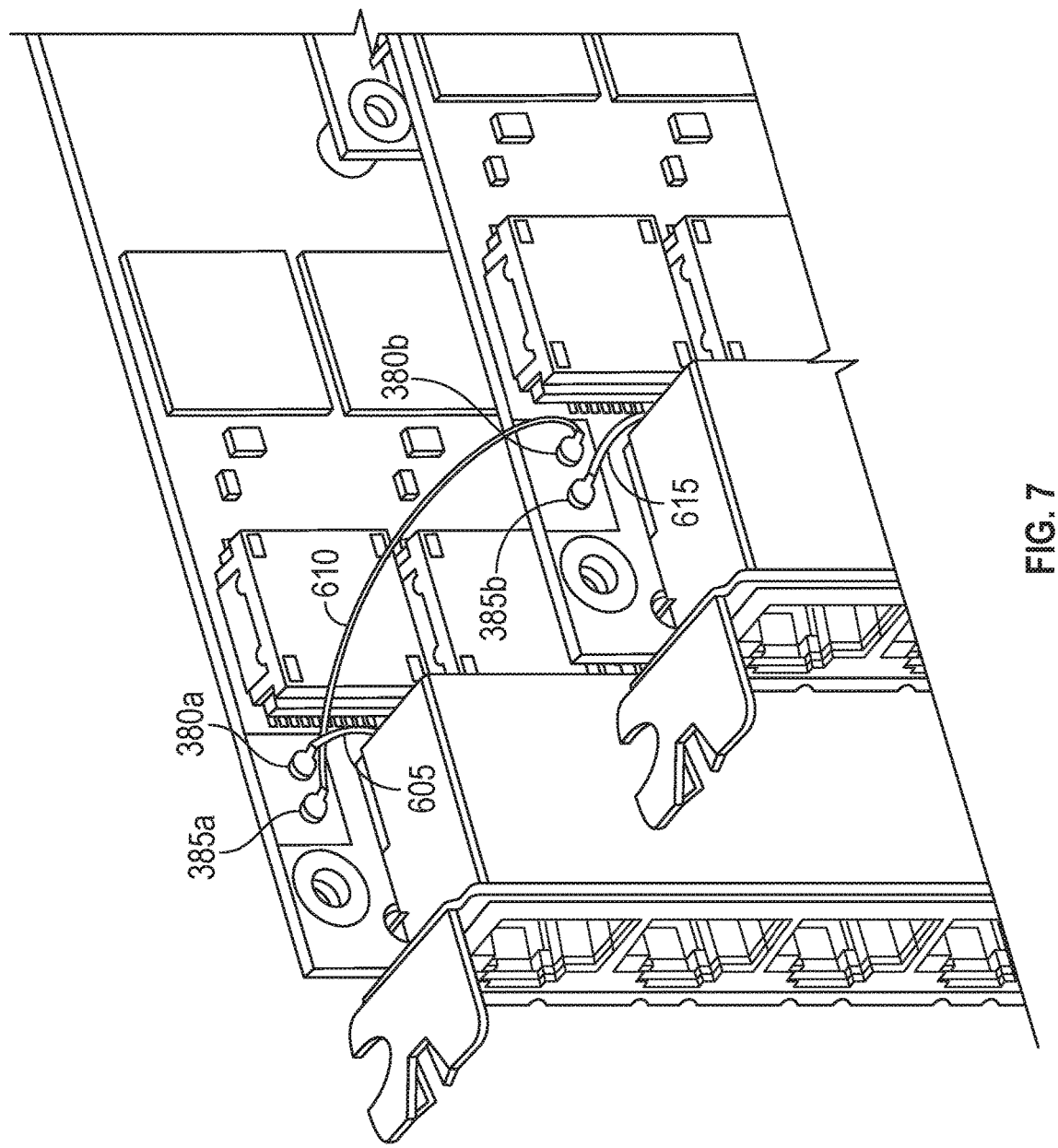
FIG. 7 is a blown up version of FIG. 6 focusing on the Frame Lock in and Frame Lock out portions of the video cards.

FIG. 6 illustrates how video cards 110 may be daisy chained together for Frame Lock and/or Genlock operation. In Frame Lock operation, the Frame Lock master signal on timing out connector 380*b* of a first video card 110*b* is connected via cable 610 to the Frame Lock in connector 385*a* on a second video card 110*a*. If an external time server is used (not shown), it could be externally connected to BNC connector 520*b* which is connected via cable 615 to timing in 380*a* In this case, the synchronization signals are generated externally and the system acts as a Genlock rather than as Frame Lock. This is shown further in FIG. 6. Also, video card 110*a* may have its timing out connector 380*a* connected via cable 605 to BNC connector 520*a*. BNC connector 520*a* may be connected to a separate host computer to act as the synchronization master to that computer. FIG. 7 is simply a blown up version of FIG. 6 focusing on the Frame Lock in and Frame Lock out portions of the video cards.

Figure 8:
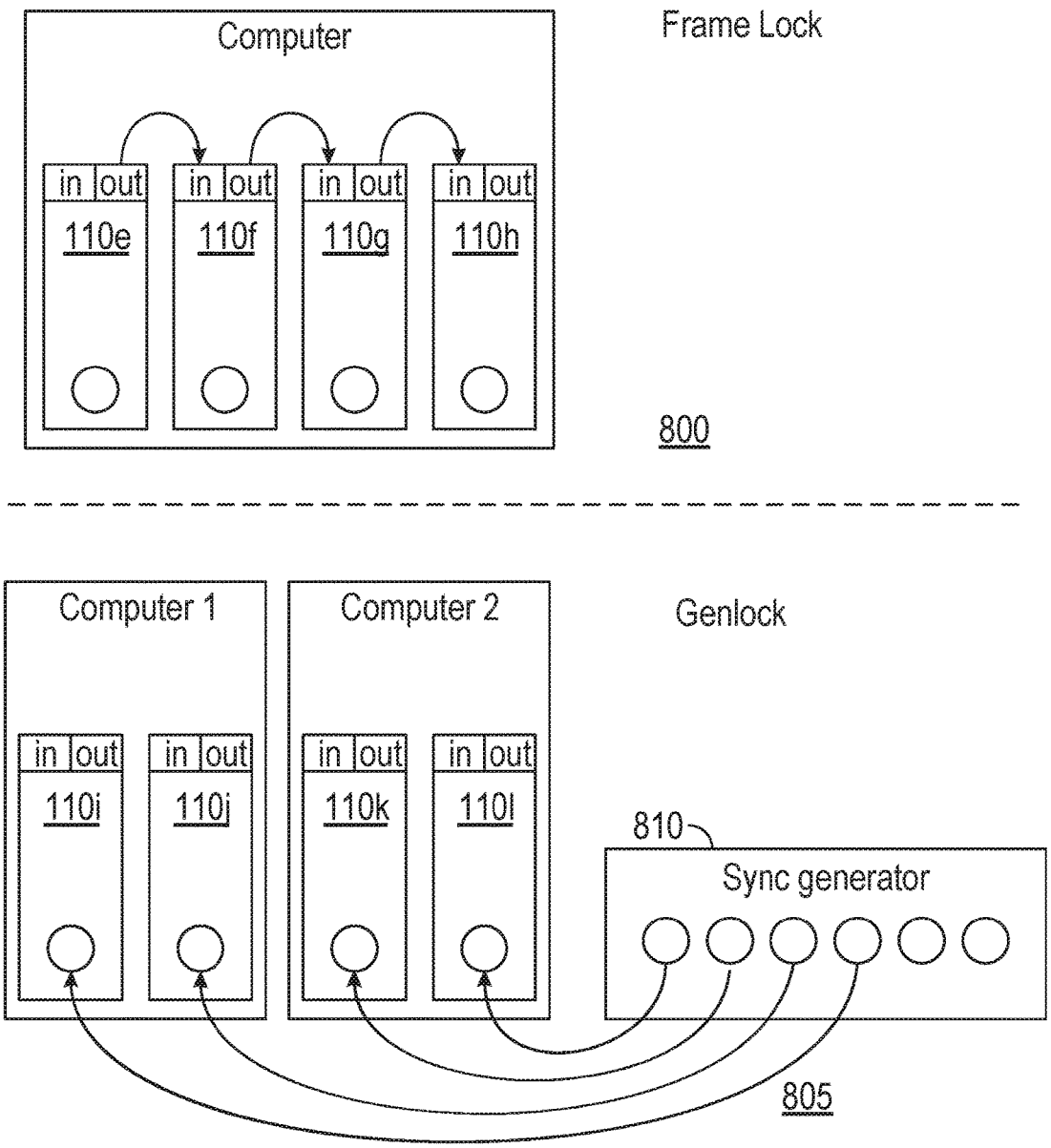
FIG. 8 shows a further exemplary implementation 800 of the system with multiple video cards 110e-110h being daisy chained in a Frame Lock mode of operation and an implementation 805 of the system with multiple video cards 110i-110l in multiple computers, computer one 810 and computer two 820 receiving from a master sync generator 810 synchronization signals directly to the video cards.

FIG. 8 shows a further exemplary implementation 800 of the system with multiple video cards 110*e*-110*h* being daisy chained in a Frame Lock mode of operation and an implementation 805 of the system with multiple video cards 110*i*-110*l* receiving direct synchronization signal from a master sync generator 810 providing synchronization signals to the video cards in a Genlock mode of operation.

Figure 9:
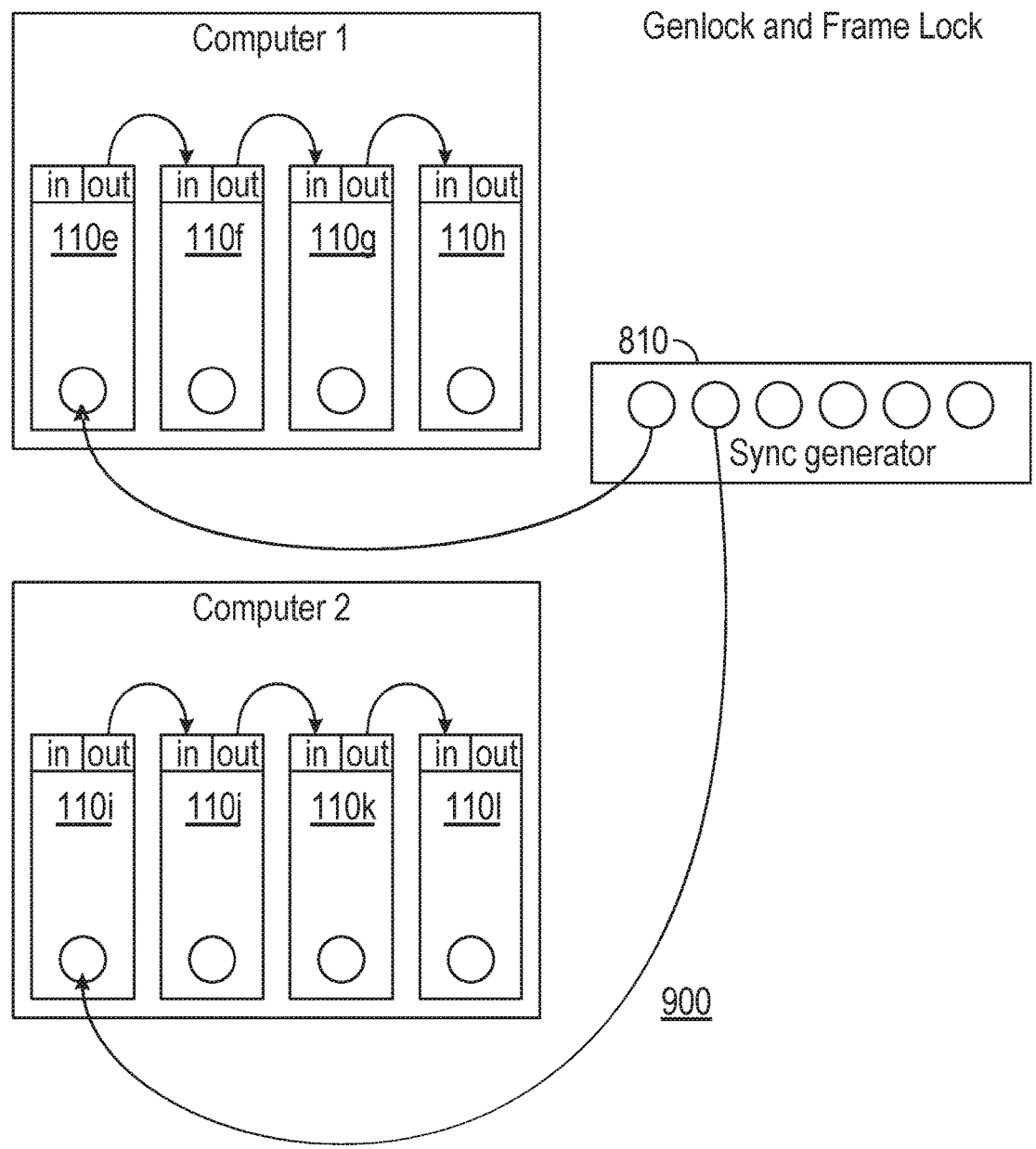
FIG. 9 illustrates a system with Genlock and Frame Lock and a master synchronization generator 810 providing synchronization signals to two cards in two respective host computers, with the synchronization signal further daisy chained within the computers, respectively.

FIG. 9 illustrates a system with Genlock and Frame Lock and a master synchronization generator 810 providing synchronization signals to two cards in two respective host computers that further daisy chain the signal to other cards inside their respective computers.

Figure 10:
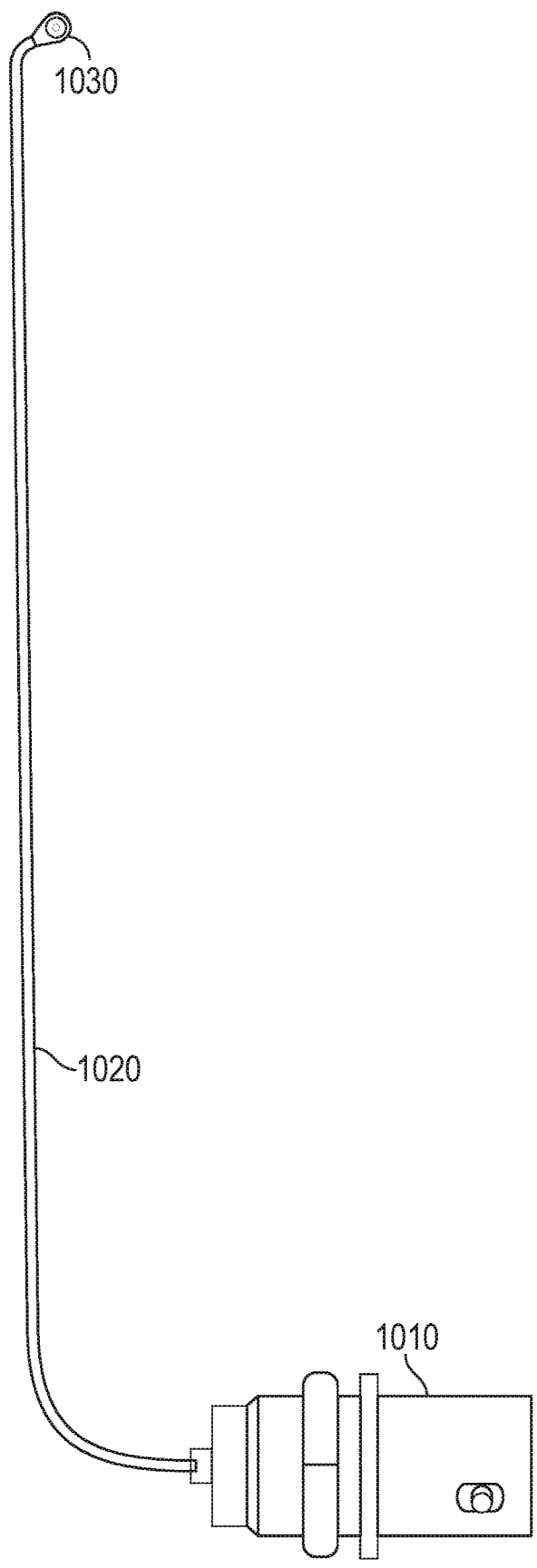
FIG. 10 shows a sync cable assembly.

FIG. 10 shows the sync cable assembly 1000 consisting of a BNC connector 1010, a miniature coaxial cable 1020, and a connector 1030 which may be of types U.FL, IPEX, IPAX, IPX, AMC, MHF or UMCC.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above.

Rather, the specific features and acts described above are disclosed as example for embodiments of the disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A video card, comprising:
   a peripheral component interconnect ("PCI") card;
   a mobile PCI express module ("MXM") connector mounted on the PCI card and physically receiving an MXM card having a GPU and electronically receiving a video signal from the GPU;
   a local area network video converter mounted on the PCI card for receiving the video signal from the MXM connector and for converting the video signal to a signal suitable for transmission on a local area network ("LAN") cable; and
   an Extended Display Identification Data (EDID) memory connected to the local area network video converter, storing EDID information emulating a display presented to the video card, wherein the EDID memory is physically located within the video card.

2. The video card of claim 1, further comprising an MXM card connected to the MXM connector.

3. The video card of claim 1, further comprising a controller coupled to the MXM connector and the local area network converter.

4. The video card of claim 3, wherein the MXM connector receives six video signals from the GPU and the local area network converter converts the six video signals to six signals for transmission on six respective LAN cables.

5. The video card of claim 4, wherein the controller detects whether the MXM card is a first type or a second type and enables the video card to accept either type of MXM card.

6. The video card of claim 1, further comprising a power conversion circuit for powering the MXM card via the MXM connector using only power drawn from a PCI connector of the PCI card without requiring an additional optional auxiliary power connector.

7. The video card of claim 1, further comprising a Frame Lock master signal at the MXM connector and a Frame Lock slave signal at the MXM connector for synchronizing video frames in the video signal across multiple video cards.

8. The video card of claim 1, further comprising a 3D-sync signal from the MXM connector for providing a signal protocol designating the left or right frame of a 3D signal.

9. The video card of claim 3, further comprising a universal serial bus ("USB") port coupled to the controller.

10. The video card of claim 9, further comprising a multi-format video sync generator unit connected to the controller and controlled from a host computer via the USB port, wherein the multi-format video sync generator unit serves as a timing server for the video card, as well as a second video card in the same host computer or a different computer.

11. The video card of claim 10, wherein the multi-format video sync generator unit provides a timing synchronization signal over a sync cable assembly.

12. The video card of claim 10, wherein the multi-format video sync generator unit provides a timing synchronization signal to a first timing connector on the video card.

13. The video card of claim 10, wherein the multi-format video sync generator unit is connected to a second timing connector, wherein when the multi-format video sync generator unit detects a signal on the second timing connector it acts as a slave to an external master and behaves as a timing client and further wherein the input is compatible with a generator lock external sync generator.

14. The video card of claim 13, wherein the host computer can configure the multi-format video sync generator to be established as a master, a slave, or auto-configured based on an input from the second timing connector.

15. The video card of claim 9, wherein the MXM connector receives n video signals from the GPU and the local area network converter converts the n video signals to n signals for transmission on n respective LAN cables, where n is greater than or equal to 1.

16. The video card of claim 15, wherein the USB port maps one serial port for each of the n video signals and each serial port is mapped to a virtual, non-physical COM port via a single USB cable as a USB multifunction device.

17. The video card of claim 16, wherein the USB port maps an nth+1 serial port to a COM port on the computer in which the video card is mounted, the nth+1 serial port for communication with the controller.

18. The video card of claim 17, wherein the controller is configured to receive an encapsulated command from the nth+1 serial port and communicate a command within the encapsulation across each of the n serial ports.

19. The video card of claim 18, wherein the controller is configured to receive a response to the command, encapsulate the response to the command along with the channel from which that response was received, and send that encapsulated response to the nth+1 serial port.

20. The video card of claim 17, wherein the controller is configured to receive a command from the nth+1 serial port and to respond to the command.

21. The video card of claim 3, wherein the controller is powered by standby power, such that it receives power regardless of the power state of the computer in which the card is mounted.

22. The video card of claim 1, wherein the local area network converter comprises:
   a video converter coupled to the MXM connector for converting Display Port ("DP") video from the MXM connector to HDMI video; and
   an audio/video transmitter coupled to the video converter for receiving HDMI video from the converter and for transmitting the HDMI video over the LAN cable.

23. The video card of claim 1, wherein the LAN cable is a twisted pair cable.

24. The video card of claim 1, wherein the LAN cable is a fiber optic cable.

25. The video card of claim 3, wherein the controller is operable to reset the computer in which the video card is mounted based on receiving a PCI-Reset signal.

26. The video card of claim 3, wherein the controller is operable to wake-up the computer in which the video card is mounted based on asserting a PCI-Wake signal.

27. The video card of claim 3, wherein the controller is operable to override the power button of the computer in which the video card is mounted.

28. The video card of claim 27, wherein the controller is configured to have the computer follow the power state of an external display connected to the LAN cable.

29. The video card of claim 27, further comprising a plurality of LAN cables respectively connected to a plurality of displays, wherein the controller is configured to have the power state of a first of the plurality of displays control the power state of the remaining plurality of displays.

30. A method of transmitting video signals, comprising:
   providing a video card, comprising:
      a peripheral component interconnect ("PCI") card;
      a mobile PCI express module ("MXM") connector mounted on the PCI card and physically receiving an MXM card having a GPU and electronically receiving a video signal from the GPU;
      a local area network video converter mounted on the PCI card for receiving the video signal from the MXM connector and for converting the video signal to a signal suitable for transmission on a local area network ("LAN") cable; and
      an Extended Display Identification Data (EDID) memory connected to the local area network video converter, storing EDID information emulating a display presented to the video card, wherein the EDID memory is physically located within the video card;
   receiving the video signal from the MXM card on the PCI card; and
   transmitting the video signal from the PCI card to the LAN cable.

31. A method of detecting a type of MXM card mounted on an MXM connector, comprising:
   initializing a system to a default setting of a first type of MXM card;
   receiving a signal indicating the presence of one or more video signals on the first through fifth video signals;
   if there is a video signal on any of the first through fifth video signals and if a video signal on the sixth video channel is not detected, changing the type of MXM card;
   if a video signal is detected after changing the type of video card to the second type, updating the default setting of the type of MXM card and storing it in non-volatile memory so that the card will be powered up and configured for the correct type of MXM card; and
   setting a switch or jumper to manually select either a first type or a second type of MXM card.

* * * * *